United States Patent
Sutardja et al.

(10) Patent No.: US 9,480,112 B2
(45) Date of Patent: Oct. 25, 2016

(54) CURRENT SHAPING FOR DIMMABLE LED

(71) Applicant: MARVELL WORLD TRADE LTD, St. Michael (BB)

(72) Inventors: Sehat Sutardja, Los Altos Hills, CA (US); Pantas Sutardja, Los Gatos, CA (US); Wanfeng Zhang, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/550,259

(22) Filed: Nov. 21, 2014

(65) Prior Publication Data

US 2015/0078047 A1    Mar. 19, 2015

Related U.S. Application Data

(63) Continuation of application No. 14/285,058, filed on May 22, 2014.

(60) Provisional application No. 61/830,791, filed on Jun. 4, 2013, provisional application No. 61/827,159, filed on May 24, 2013.

(51) Int. Cl.
*H02M 3/335* (2006.01)
*H05B 33/08* (2006.01)
(Continued)

(52) U.S. Cl.
CPC ....... *H05B 33/0815* (2013.01); *H02M 1/4258* (2013.01); *H02M 3/335* (2013.01); *H02M 3/33507* (2013.01); *H02M 7/219* (2013.01); *H05B 33/0809* (2013.01); *H05B 33/0845* (2013.01); *Y02B 70/126* (2013.01)

(58) Field of Classification Search
CPC .................................................... H02M 3/335
USPC ......... 363/78, 49, 21.16; 315/193, 294, 307, 315/308
See application file for complete search history.

(56) References Cited

U.S. PATENT DOCUMENTS 8,093,826 B1 *   1/2012   Eagar et al. ............ 315/291
2009/0079355 A1 *   3/2009   Zhou et al. ............ 315/246
(Continued)

FOREIGN PATENT DOCUMENTS

WO    WO 2010/011971 A1    1/2010
WO    WO 2012/016197 A1    2/2012

OTHER PUBLICATIONS

European Office Communication issued Nov. 9, 2015 in European Patent Application No. 14169663.3-1802 / 2844037 entitled Communication pursuant to Rule 69 EPC—reminder concerning payment of the designation fee (Art. 79(2) EPC) and of the examination fee (Art. 94(1) EPC)—and invitation pursuant to Rule 70a(1) EPC.

(Continued)

*Primary Examiner* — Matthew Nguyen
*Assistant Examiner* — Trinh Dang

(57) ABSTRACT

Aspects of the disclosure provide a circuit that includes a detector and a controller. The detector is configured to detect a firing start by a triode for alternating current (TRIAC) in a power supply. The controller is configured to control a switch in connection with a magnetic component in response to the firing start to shape a profile of a current pulled from the power supply to satisfy a latch current requirement and a hold current requirement of the TRIAC.

20 Claims, 4 Drawing Sheets

(51) Int. Cl.
*H02M 1/42* (2007.01)
*H02M 7/219* (2006.01)

(56) References Cited

U.S. PATENT DOCUMENTS

| | | | |
|---|---|---|---|
| 2012/0025729 A1* | 2/2012 | Melanson | H05B 33/0815 315/224 |
| 2012/0049752 A1 | 3/2012 | King et al. | |
| 2013/0057167 A1* | 3/2013 | Angeles | 315/200 R |
| 2013/0154496 A1* | 6/2013 | Maru | H02M 1/44 315/210 |
| 2013/0242625 A1* | 9/2013 | Yan et al. | 363/49 |

OTHER PUBLICATIONS

Extended European Search Report issued Oct. 6, 2015 in Patent Application No. 14169663.3.

Thomas Stamm, "STEVAL-ILL044V1: 9 W Triac dimmable, high power factor, isolated LED driver based on the HVLED815PF (for US market)" AN4129 Application Note, Doc ID 023314 Rev 1, http://www.st.com/st-web-ui/static/active/en/resource/technical/document/application_note/DM00057586.pdf, XP055117757, Oct. 2012, pp. 1-39.

* cited by examiner

CURRENT SHAPING FOR DIMMABLE LED

INCORPORATION BY REFERENCE

This application is a continuation of U.S. patent application Ser. No. 14/285,058, "CURRENT SHAPING FOR DIMMABLE LED" filed on May 22, 2014, which claims the benefit of U.S. Provisional Application No. 61/827,159, "New Latch Current Shaping Method to Improve Phase Cut Dimmer Compatibility" filed on May 24, 2013, and U.S. Provisional Application No. 61/830,791, "New Latch Current Shaping Method to Improve Phase Cut Dimmer Compatibility" filed on Jun. 4, 2013. The entire disclosures of the prior applications are hereby incorporated by reference herein in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Light emitting diode (LED) lighting devices provide the advantages of low power consumption and long service life. Thus, LED lighting devices may be used as general lighting equipment to replace, for example, fluorescent lamps, bulbs, halogen lamps, and the like.

SUMMARY

Aspects of the disclosure provide a circuit that includes a detector and a controller. The detector is configured to detect a firing start by a triode for alternating current (TRIAC) in a power supply. The controller is configured to control a switch in connection with a magnetic component in response to the firing start to shape a profile of a current pulled from the power supply to satisfy a latch current requirement and a hold current requirement of the TRIAC.

According to an aspect of the disclosure, the controller is configured to pull the current at a first level to enable enough latch current for the TRIAC at the firing start, and is configured to pull the current at a second level that is lower than the first level to enable enough hold current for the TRIAC after the firing start. In an example, the controller is configured to control at least one of a rising edge delay for the current to rise to the first level, a rising edge slope for the current to rise to the first level, a duration for the current to above a threshold, and a falling edge slope for the current to fall from the first level to the second level.

In an embodiment, the detector is configured to detect a switching current passing through the switch, and the controller is configured to control the switch according to the detected switching current to shape the current pulled from the power supply. In an example, the current pulled from the power supply includes the switching current, and a damping current by a damping circuit.

Aspects of the disclosure provide an apparatus that includes a switch in connection with a magnetic component for transferring energy from an energy source to a load. Further, the apparatus includes an integrated circuit (IC) chip having a detector and a controller. The detector is configured to detect a firing start by a triode for alternating current (TRIAC) in the energy source. The controller is configured to control the switch in response to the firing start to shape a profile of a current pulled from the energy source to satisfy a latch current requirement and a hold current requirement of the TRIAC.

Aspects of the disclosure provide a method. The method includes detecting a firing start by a triode for alternating current (TRIAC) in a power supply, and switching on/off a switch in connection with a magnetic component in response to the firing start to shape a profile of a current pulled from the power supply to satisfy a latch current requirement and a hold current requirement of the TRIAC.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
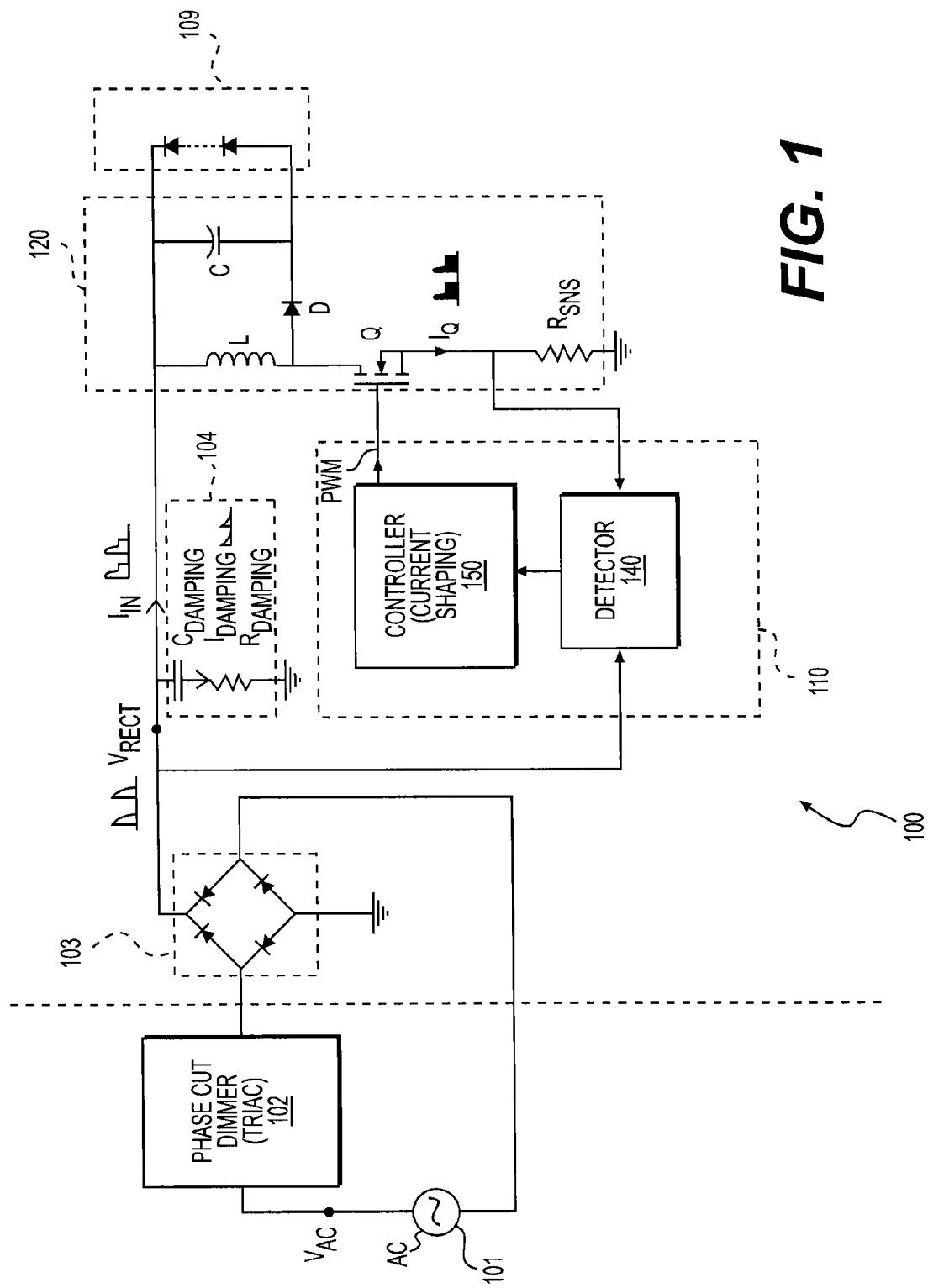
FIG. 1 shows a block diagram of an electronic system 100 according to an embodiment of the disclosure.

FIG. 1 shows a block diagram of an electronic system 100 according to an embodiment of the disclosure. The electronic system 100 receives electric energy from an energy source, such as an AC power supply 101 with or without a dimmer 102. The AC power supply 101 can be any suitable AC power supply, such as 60 Hz 110V AC power supply, 50 Hz 220V AC power supply, and the like. In an embodiment, an existing power supply, for example in the form of a power socket built in a wall includes the AC power supply 101 with or without the dimmer 102. The electronic system 100 is plugged into the power socket to receive power from the existing power supply. The electronic system 100 is configured to be compatible with various possible existing power supply. For example, the electronic system 100 is configured to be compatible with an existing power supply with the dimmer 102. Specifically, according to an aspect of the disclosure, the electronic system 100 is configured to shape a profile of a current drawn from an existing power supply when the dimmer 102 exists to be compatible with the existing power supply.

In an embodiment, the dimmer 102 is a phase-cut type dimmer, such as a triode for alternating current (TRIAC), having an adjustable dimming angle α. The dimming angle α defines a size of a phase-cut range during which the TRIAC is turned off. Further, a phase range that is out of the phase-cut range can be referred to as a conduction angle during which the TRIAC is turned on. During an AC cycle, when the phase of the AC voltage $V_{AC}$ is in the phase-cut range, the TRIAC is turned off. Thus, an output voltage of the dimmer 102 is about zero. When the phase of the AC voltage $V_{AC}$ is out of the phase-cut range (e.g., in the conduction angle), the TRIAC is turned on. Thus, the output voltage of the dimmer 102 is about the same as the AC voltage $V_{AC}$. The phase-cut dimmer 102 can be a leading edge TRIAC, a trailing edge dimmer, or other type of dimmer.

Generally, the TRIAC type dimmer 102 requires a latch current at a firing start to turn on the TRIAC type dimmer 102, and a hold current during the turn-on time after the firing start. The latch current is a minimum current required at the firing start to turn on the TRIAC type dimmer 102, and the hold current is the minimum current required to maintain the turn-on status for the TRIAC type dimmer 102. Typically, the latch current and the hold current are about 5 to 50 mA, and the latch current is larger than the hold current. When one or both of the latch current requirement and the hold current requirement are not satisfied, the TRIAC type dimmer 102 misfires and may cause unpleasant user experience, such as light flickering when the electronic system 100 is a lighting system.

According to an aspect of the disclosure, the electronic system 100 drives a load 109 that is a power efficient device. In an example, the load 109 is a light emitting diode (LED) lighting device that generally draws a relatively small current from the power supply. According to the aspect of the disclosure, the electronic system 100 is configured to shape a profile of a current drawn from the power supply to be compatible with, for example the TRIAC type the dimmer 102. In an example, the electronic system 100 is configured to pull the current at a first level that is large enough to satisfy the latch current requirement of the TRIAC type dimmer 102 at the firing start, and pull the current at a second level that is large enough to satisfy the hold current requirement of the TRIAC type dimmer 102 after the firing start.

In the FIG. 1 example, the electronic system 100 includes a rectifier 103, a damping circuit 104, a control circuit 110, an energy transfer module 120, and a load 109. These elements are coupled together as shown in FIG. 1. Generally, the energy transfer module 120 includes one or more switches, and the control circuit 110 controls the switches to transfer energy from the energy source to the load 109. The load 109 can be any suitable device, such as a lighting device, a fan, and the like. In an embodiment, the load 109 includes a plurality of light emitting diodes (LEDs). The load 109 and the other components of the electronic system 100 are assembled into a package to form an LED lighting device to replace, for example, a fluorescent lamp, a halogen lamp, and the like.

Specifically, in the FIG. 1 example, the rectifier 103 rectifies an AC voltage to a fixed polarity, such as to be positive. In an example, the rectifier 103 is a bridge rectifier. The bridge rectifier 103 receives the output voltage of the dimmer 102, and rectifies the received voltage to a fixed polarity, such as to be positive, and provides a rectified voltage $V_{RECT}$ to following circuits, such as the energy transfer module 120.

According to an aspect of the disclosure, the damping circuit 104 is configured to draw additional current from the power supply in order to support the operation of the dimmer 102. In an example, the total current drawn from the power supply is refereed to as line current, the current drawn by the damping circuit 105 is referred to as damping current $I_{DAMPING}$, and the current drawn by the energy transfer module 120 is referred to as an input current $I_{IN}$. The line current is the sum of the damping current and the input current.

In the FIG. 1 example, the damping circuit 104 includes a resistor $R_{DAMPING}$ and a capacitor $C_{DAMPING}$ coupled together. At the time of the firing start in the dimmer 102, the damping circuit 105 provides a current path for high frequency components to reduce voltage and current spikes in the rectified voltage $V_{RECT}$ due to the firing. In an example, when the capacitor $C_{DAMPING}$ has a relatively large capacitance, such as in the order of µF, the damping circuit 105 can draw a relatively large damping current at the time of the firing start, and thus the electronic system 100 is relatively stable. However, the large capacitance makes it difficult to reduce the size of the electronic system 100.

In an embodiment, the electronic system 100 is implemented to use a relatively small capacitor $C_{DAMPING}$, such as in the order of nF or less, to reduce the size of the electronic system 100. Further, the electronic system 100 is configured to shape the input current $I_{IN}$ in order to cause the line current drawn from the power supply to satisfy the latch current requirement and the hold current requirement. In another embodiment, the electronic system 100 does not have the damping circuit 104, the input current $I_{IN}$ is shaped to cause the line current drawn from the power supply to satisfy the latch current requirement and the hold current requirement.

The energy transfer module 120 transfers electric energy provided by the rectified voltage $V_{RECT}$ to one or more load devices, such as the load 109 and the like. In an embodiment, the energy transfer module 120 is configured to use a magnetic component, such as a transformer, an inductor, and the like to transfer the electric energy. The energy transfer module 120 can have any suitable topology, such as a fly-back topology, a buck-boost topology, and the like. In the FIG. 1 example, the energy transfer module 120 includes an inductor L, a switch Q, a diode D, a capacitor C, and a current sensing resistor $R_{SNS}$. These components are coupled to the energy source (e.g., the rectified voltage $V_{RECT}$) and the load 109 in a buck-boost topology as shown in FIG. 1 to drive the load 109. It is noted that the energy transfer module 120 can be modified to use other suitable topology to transfer the electric energy.

Generally, in the FIG. 1 example, when the switch Q is switched on (e.g., conductive), the inductor L, the switch Q, and the current sensing resistor $R_{SNS}$ form a current path from the power supply to the ground, the power supply charges the inductor L, and the inductor L stores electric energy. When the switch Q is switched off (e.g., non-conductive), the electric energy stored in the inductor L is discharged to the load 109 and the capacitor C. The capacitor C stores the electric energy. The electric energy stored in the capacitor C can be provided to the load 109 during the time duration when the switch Q is switched on. When the switch Q is switched on/off fast, the inductor L is charged and discharged slightly in each cycle, and a relatively steady voltage to the load 109 can be maintained.

The current sensing resistor $R_{SNS}$ is configured to sense the current $I_Q$ flowing through the switch Q, and provide the sensed current to the control circuit 110. In an example, the current sensing resistor $R_{SNS}$ has a relatively small resistance such that a voltage drop on the resistor is small compared to the rectified voltage $V_{RECT}$. The voltage drop is indicative of the current $I_Q$. In an example, the voltage drop is provided to the control circuit 110 as the sensed current. It is noted that, in another embodiment, a different current sensing technique, such as a current mirror based current sensing technique is used to replace the current sensing resistor $R_{SNS}$.

The control circuit 110 provides control signals to control the operations of the switch Q to transfer the electric energy to the load 109. In an example, the control circuit 110 provides a pulse width modulation (PWM) signal with pulses having a relatively high frequency, such as in the order of 100 KHz, and the like, to control the switch Q.

According to an embodiment of the disclosure, the control circuit 110 monitors the input voltage, such as the rectified voltage $V_{RECT}$, and detects a firing start of the TRIAC type dimmer 102 in the power supply. Then the control circuit 110 generates the PWM signal in response to the firing start to control the switch Q, and shape the current pulled from the power supply to support the operation of the TRIAC type dimmer 102.

In an embodiment, the control circuit 110 is integrated on one or more integrated circuit (IC) chips. In the FIG. 1 example, the control circuit 110 includes a detector 140 and a controller 150. The detector 140 includes any suitable detecting circuits to detect various parameters in the electronic system 100, such as the voltage level of the rectified voltage $V_{RECT}$, the current $I_Q$ flowing through the switch Q and the like.

The controller 150 then generates the PWM signal to control the switch Q based on the detected parameters. The controller 150 can use any suitable algorithm to generate the PWM signal. In an example, the controller 150 fixes the frequency of the PWM signal and adjusts a peak current limit to shape the current pulled from the power supply. In the FIG. 1 example, the switch Q is implemented as an N-type metal-oxide-semiconductor (MOS) transistor, and the PWM signal is provided to the gate terminal of the N-type MOS transistor. The PWM signal switches between a first voltage level (e.g., 12V) and a second voltage level (e.g., ground) at a high switching frequency, such as 200 KHz in an example. In each switching cycle, in an example, the controller 150 first provides the first voltage level (e.g., 12V) to the gate terminal of the N-type MOS transistor to switch on the N-type MOS transistor. When the N-type MOS transistor is switched on, the current $I_Q$ gradually increases, and energy is accumulated in the inductor L. The detector 140 monitors the current $I_Q$. When the current $I_Q$ reaches the peak current limit, the controller 150 provides the second voltage level (e.g., ground) to the gate terminal of the N-type MOS transistor to switch off the N-type MOS transistor.

In an embodiment, in response to a detected firing start, the controller 150 uses a relatively large peak current limit. Then, after a time duration, the controller 150 reduces the peak current limit, and provides the PWM signal according to the reduced peak current limit. Due to the fixed frequency, the energy transfer module 120 pulls a relatively large current at the firing start, and a reduced current after the firing start. The frequency of the PWM signal, the relatively large peak current limit, and the reduced peak current limit are determined to satisfy the latch current requirement and the hold current requirement of the TRIAC type dimmer 102.

In another example, the controller 150 uses a constant peak current limit and adjusts the frequency of the PWM signal to shape the current pulled from the power supply. In an embodiment, in response to a detected firing start, the controller 150 uses a relatively large frequency to generate the PWM signal. Then, after a time duration, the controller 150 reduces the frequency. Due to the constant peak current, the energy transfer module 120 pulls a relatively large current at the firing start, and a reduced current after the firing start. The constant peak current limit, the relatively large frequency of the PWM signal, and the reduced frequency are determined to satisfy the latch current requirement and the hold current requirement of the TRIAC type dimmer 102.

It is noted that, in another example, the controller 150 adjusts both the peak current limit and the frequency of the PWM signal to shape the current pulled from the power supply.

In an embodiment, one or more profiles for current to be pulled from the power supply is stored. In an example, a profile includes a latching portion and a holding portion. The profile includes a plurality of parameters, such as a rising edge delay, a rising edge slope, a duration of latch current flat area, a falling edge slope from the latch current to the hold current, and the like to define the preferred shape of latching portion and the holding portion of the current. According to the profile, the controller 150 determines the peak current and the frequency of the PWM signal, and generates the PWM signal to control the switch Q, thus the current pulled from the power supply can match the profile. In an example, the controller 150 dynamically adjusts the peak current and the frequency of the PWM signal based on detected voltage or current parameters in the electronic system 100 to satisfy various requirements, such as the latch current requirement, the hold current requirement, and the like.

The controller 150 can be implemented using any suitable technology. In an embodiment, the controller 150 is implemented as software instructions executed by a processor. In another embodiment, the controller 150 is implemented using integrated circuits.

Figure 2:
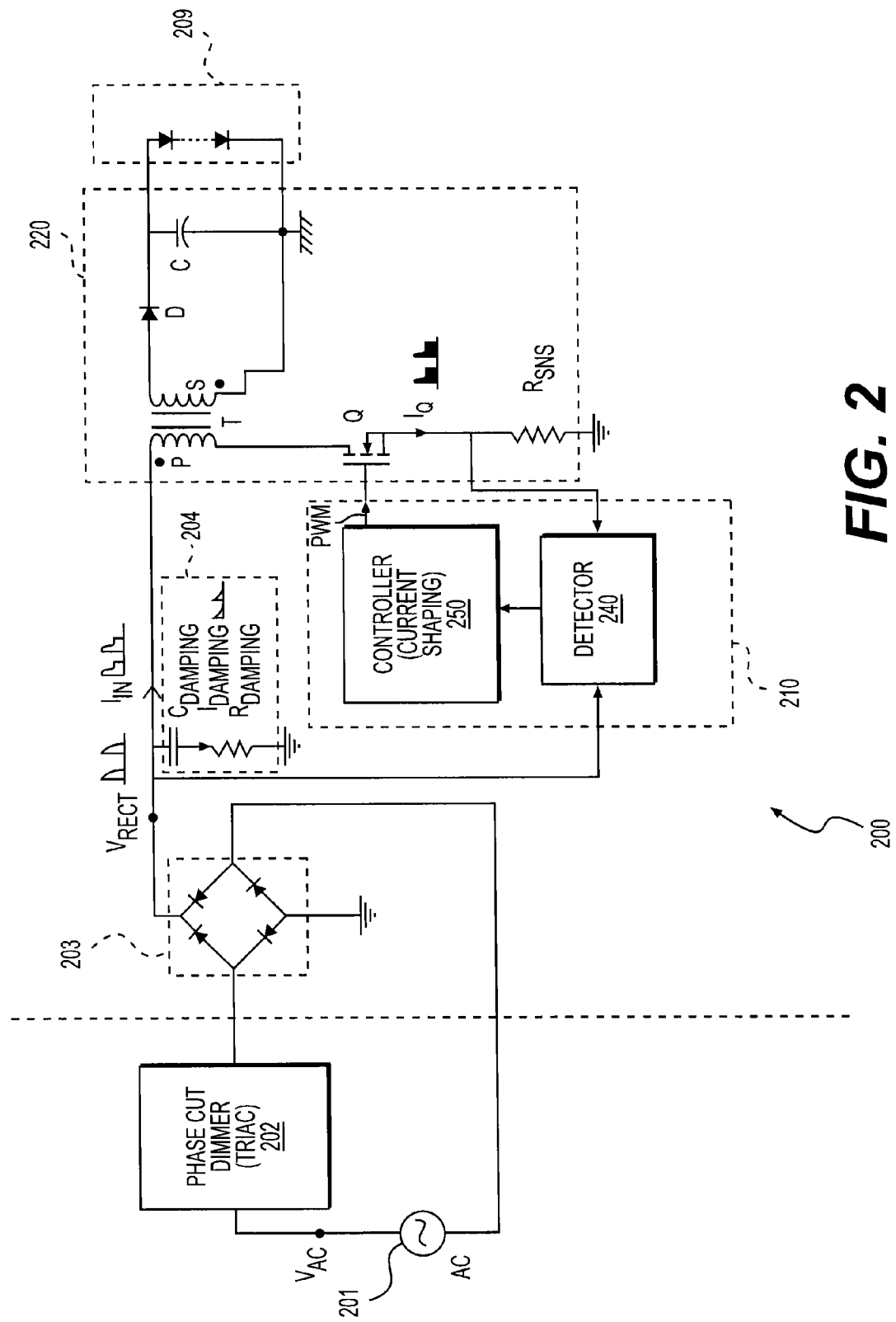
FIG. 2 shows a block diagram of another electronic system 200 according to an embodiment of the disclosure.

FIG. 2 shows a block diagram of another electronic system example 200 using a fly-back topology according to an embodiment of the disclosure. The electronic system 200 operates similarly to the electronic system 100 described above. The electronic system 200 also utilizes certain components, such as the rectifier 203, the damping circuit 204, the control circuit 210, and the load 209, that are identical or equivalent to those used in the electronic system 100; the description of these components has been provided above and will be omitted here for clarity purposes.

In the FIG. 2 example, the energy transfer module 220 includes a transformer T, a switch Q, a diode D, a capacitor C, and a sensing resistor $R_{SNS}$ coupled together in a fly-back topology. The transformer T includes a primary winding (P) coupled with the switch Q to receive the rectified voltage $V_{RECT}$ and includes a secondary winding (S) coupled to the load 209 to drive the load 209.

In an embodiment, the control circuit 210 provides control signals to control the operations of the switch Q to transfer the electric energy from the primary winding to the secondary winding. In an example, the control circuit 210 provides a pulse width modulation (PWM) signal with pulses having a relatively high frequency, such as in the order of 100 KHz, and the like, to control the switch Q.

Specifically, in an example, when the switch Q is switched on, a current $I_Q$ flows through the primary winding of the transformer T, and the switch Q. The polarity of the transformer T and the direction of the diode D can be arranged such that there is no current in the secondary winding of the transformer T when the switch Q is switched on. Thus, the received electric energy is stored in the transformer T.

When the switch Q is switched off, the current $I_Q$ becomes zero. The polarity of the transformer T and the direction of the diode D can enable the secondary winding to deliver the stored electric energy to the capacitor C and the load 209. The capacitor C can filter out the high frequency components and enable a relatively stable load current to be driven to the load 209.

Figure 3:
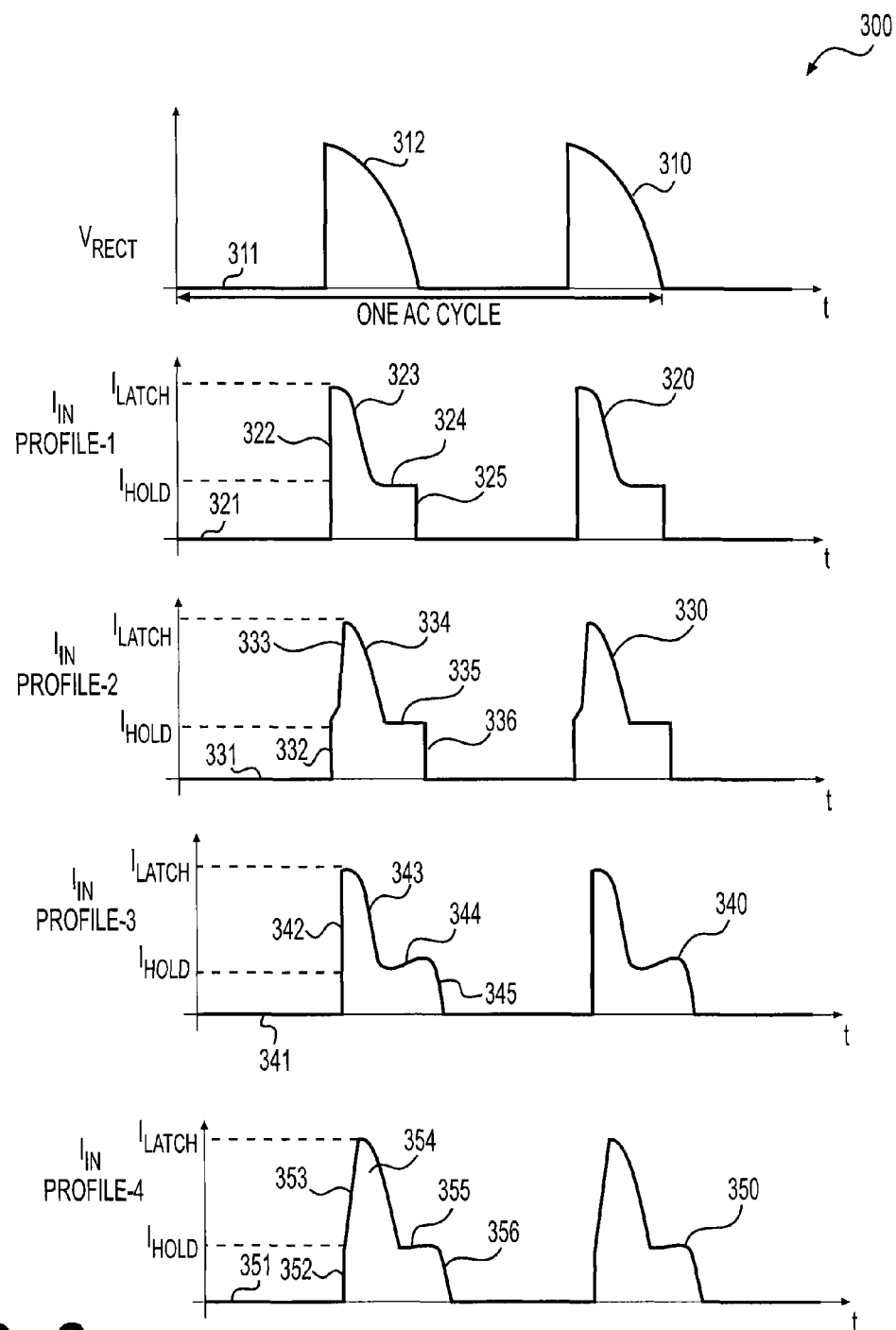
FIG. 3 shows a plot of waveforms according to an embodiment of the disclosure.

FIG. 3 shows a plot 300 of waveforms in an AC cycle according to an embodiment of the disclosure. The plot 300 includes a first waveform 310 for the rectified voltage $V_{RECT}$, a second waveform 320 for a first profile of the input current $I_{IN}$, a third waveform 330 for a second profile of the input current $I_{IN}$, a fourth waveform 340 for a third profile of the input current $I_{IN}$, a fifth waveform 350 for a fourth profile of the input current $I_{IN}$.

In the FIG. 3 example, the power supply includes a TRIAC type dimmer. During an AC cycle, when the AC voltage $V_{AC}$ crosses zero, the TRIAC is turned off, the rectified voltage $V_{RECT}$ is about zero, as shown by 311. When the TRIAC is turned on, the rectified voltage $V_{RECT}$ is about the same as the AC voltage $V_{AC}$, as shown by 312.

According to the first profile, at the time of the TRIAC firing start, without rising edge delay, the input current $I_{IN}$ rises to about the latch current $I_{LATCH}$ with a very large rising edge slope, as shown by 322. The input current $I_{IN}$ then stays about the latch current $I_{LATCH}$ level for a time duration, and then falls to the hold current $I_{HOLD}$ level with a falling edge slope, as shown by 323. Further, the input current $I_{IN}$ stays constantly at the hold current $I_{HOLD}$ level until the TRIAC is turned off, as shown by 324 and 325.

According to the second profile, at the time of the TRIAC firing start, with a short rising edge delay, the input current $I_{IN}$ rises to about the latch current $I_{LATCH}$ level. For example, the input current $I_{IN}$ first rises to about the hold current $I_{HOLD}$ level, and then rises to about the latch current $I_{LATCH}$ with a large rising edge slope, as shown by 332 and 333. The input current $I_{IN}$ then stays about the latch current $I_{LATCH}$ level for a time duration, and then falls to the hold current $I_{HOLD}$ level with a falling edge slope, as shown by 334. Further, the input current $I_{IN}$ stays constantly at the hold current $I_{HOLD}$ level until the TRIAC is turned off, as shown by 335 and 336.

According to the third profile, at the time of the TRIAC firing start, without rising edge delay, the input current $I_{IN}$ rises to about the latch current $I_{LATCH}$ with a very large rising edge slope, as shown by 342. The input current $I_{IN}$ then stays about the latch current $I_{LATCH}$ level for a time duration, and then falls to the hold current $I_{HOLD}$ level with a falling edge slope, as shown by 343. Further, the input current $I_{IN}$ increases from the hold current $I_{HOLD}$ level as the rectified voltage $V_{RECT}$ drops to keep the delivered power to be relatively constant until the TRIAC is turned off, as shown by 344 and 345.

According to the fourth profile, at the time of the TRIAC firing start, with a short rising edge delay, the input current $I_{IN}$ rises to about the latch current $I_{LATCH}$ level. For example, the input current $I_{IN}$ first rises to about the hold current $I_{HOLD}$ level, and then rises to about the latch current $I_{LATCH}$ with a large rising edge slope, as shown by 352 and 353. The input current $I_{IN}$ then stays about the latch current $I_{LATCH}$ level for a time duration, and then falls to the hold current $I_{HOLD}$ level with a falling edge slope, as shown by 354. Further, the input current $I_{IN}$ increases from the hold current $I_{HOLD}$ level as the rectified voltage $V_{RECT}$ drops to keep the delivered power to be relatively constant until the TRIAC is turned off, as shown by 355 and 356.

In an example, one or more of the current profiles are stored in a control circuit, such as the control circuit 110, the control circuit 210, and the like. Then the control circuit determines control parameters for a PWM signal according to the profile. Further the control circuit generates the PWM signal according to the determined control parameters, and the PWM signal is used to control a switch to pull current from a power supply. The current pulled from the power supply then matches the profile.

Figure 4:
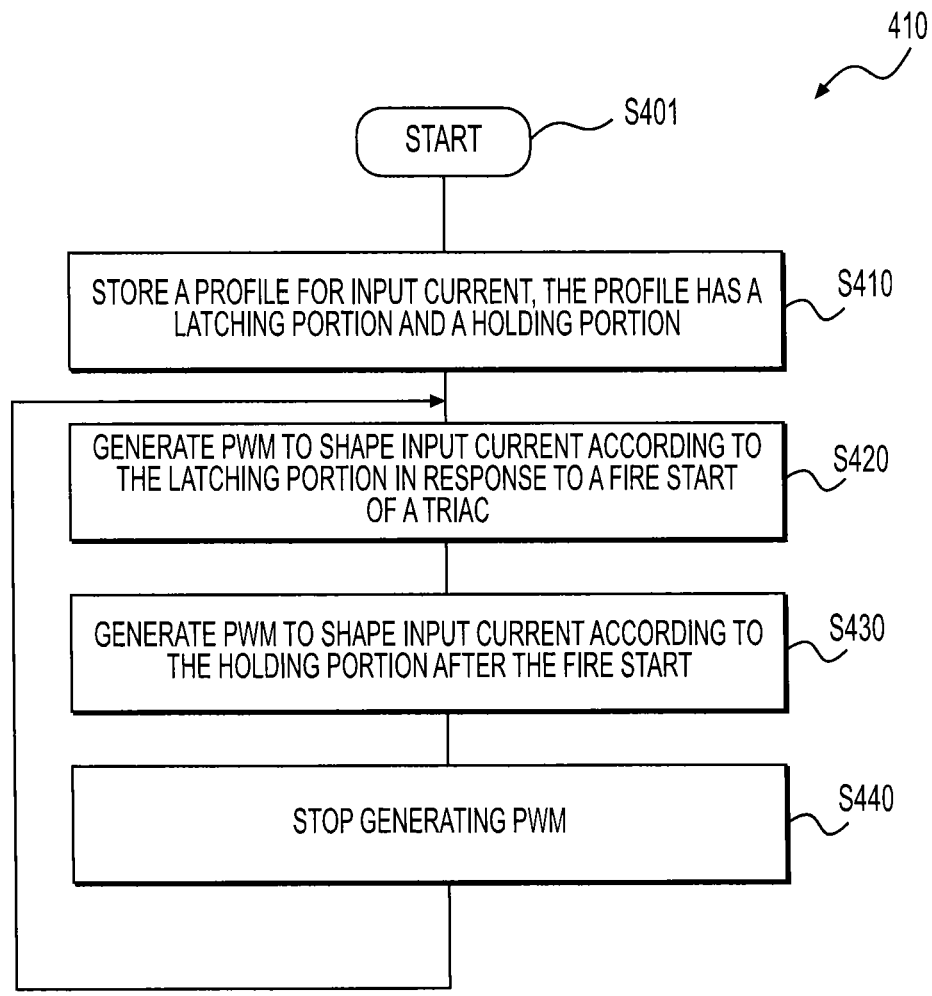
FIG. 4 shows a flow chart outlining a process example 400 according to an embodiment of the disclosure.

The FIG. 4 shows a flow chart outlining a process example 400 according to an embodiment of the disclosure. In an embodiment, the process is executed in a control circuit, such as the control circuit 110, the control circuit 210, and the like to shape a current pulled from a power supply to support the operation of the power supply, such as the operation of a TRIAC dimmer in the power supply. The process starts at S401 and proceeds to S410.

At S410, a profile for current pulled from the power supply is stored. In an embodiment, a profile, such as any one of the profiles in FIG. 3, includes a latching portion to satisfy a latch current requirement of a firing start for the TRIAC dimmer, and a holding portion to satisfy a hold current requirement for the TRIAC dimmer to stay in turn-on status after the firing start.

At S420, a PWM signal is generated to shape the current according to the latching portion in response to a firing start of the TRIAC dimmer. In an example, a detector in the control circuit, such as the detector 140 in the control circuit 110 and the like, detects a firing start of the TRIAC dimmer. Further, a controller in the control circuit, such as the controller 150 determines parameters, such as frequency, peak current limit, and the like, for the PWM signal according to the latching portion of the profile, and generates the PWM signal according to the determined parameters. The PWM signal is provided to a switch, such as the switch Q, to switch on/off the switch in order to pull current from the power supply to satisfy the latch current requirement.

At S430, the PWM signal is generated to shape the current according to the holding portion after the firing start. In an example, after a predetermined time duration, the controller 150 adjusts the parameters of the PWM signal, such as the frequency of the PWM signal, the peak current limit, and the like, according to the holding portion of the profile, and generates the PWM signal according to the adjusted parameters. The PWM signal is used to switch on/off the switch Q in order to pull current from the power supply to satisfy the hold current requirement.

At S440, the PWM signal generation is disabled when the TRIAC is turned off. And the process returns to S420 to wait for the TRIAC to fire again.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A circuit, comprising:
   a detector to detect a firing start by a triode for alternating current (TRIAC) in a power supply based on a voltage output from a rectifier that rectifies an alternative current (AC) voltage from the power supply; and
   a controller to vary a pulse width modulation (PWM) signal to voltage-control a switch in connection with a magnetic component in response to the firing start to turn on the switch, and turn off the switch when a switch current flowing through the magnetic component rises to a first peak current limit in a duration, and turn on the switch, and turn off the switch when the switch current flowing through the magnetic component rises to a second peak current limit in order to shape a profile of a current pulled from the power supply to satisfy a latch current requirement and a hold current requirement of the TRIAC.

2. The circuit of claim 1, wherein the controller is configured to control at least one of a peak current limit and/or a frequency for generating the PWM signal to pull the current at a first level to enable enough latch current for the TRIAC at the firing start.

3. The circuit of claim 1, wherein the controller is configured to control at least one of a peak current limit and a frequency for generating the PWM signal to pull the current at a second level that is lower than the first level to enable enough hold current for the TRIAC after the firing start.

4. The circuit of claim 1, wherein the controller is configured to control at least one of a peak current limit and a frequency for generating the PWM signal to control at least one of a rising edge delay for the current to rise to the first level, a rising edge slope for the current to rise to the first level, a duration for the current to above a threshold, and a falling edge slope for the current to fall from the first level to the second level and to disable the PWM signal generation.

5. The circuit of claim 1, wherein the detector detects the switching current passing through the switch, and the controller controls the switch according to the detected switching current to shape the current pulled from the power supply.

6. The circuit of claim 5, wherein the current pulled from the power supply includes the switching current, and a damping current by a damping circuit.

7. The circuit of claim 6, wherein a capacitance of the damping circuit is smaller than a specific value.

8. An apparatus, comprising:
a switch in connection with a magnetic component for transferring energy from an energy source to a load; and
an integrated circuit (IC) chip comprising:
a detector to detect a firing start by a triode for alternating current (TRIAC) in the energy source based on a voltage output from a rectifier that rectifies an alternative current (AC) voltage from the energy source; and
a controller to vary a pulse width modulation (PWM) signal to voltage-control the switch in response to the firing start to turn on the switch, and turn off the switch when a switch current flowing through the magnetic component rises to a first peak current limit in a duration, and turn on the switch, and turn off the switch when the switch current flowing through the magnetic component rises to a second peak current limit in order to shape a profile of a current pulled from the energy source to satisfy a latch current requirement and a hold current requirement of the TRIAC.

9. The apparatus of claim 8, wherein the controller is configured to control at least one of a peak current limit and a frequency for generating the PWM signal to pull the current at a first level to enable enough latch current for the TRIAC at the firing start.

10. The apparatus of claim 8, wherein the controller is configured to control at least one of a peak current limit and a frequency for generating the PWM signal to pull the current at a second level that is lower than the first level to enable enough hold current for the TRIAC after the firing start.

11. The apparatus of claim 8, wherein the controller is configured to control at least one of a peak current limit and a frequency for generating the PWM signal to control at least one of a rising edge delay for the current to rise to the first level, a rising edge slope for the current to rise to the first level, a duration for the current to above a threshold, and a falling edge slope for the current to fall from the first level to the second level and to disable the PWM signal generation.

12. The apparatus of claim 8, wherein the detector detects the switching current passing through the switch, and the controller controls the switch according to the detected switching current to shape the current pulled from the power supply.

13. The apparatus of claim 8, further comprising:
a damping circuit to pull a damping current in response to the firing start, and the current pulled from the energy source including the switching current, and the damping current.

14. The apparatus of claim 8, wherein the apparatus does not include a damping circuit, and the controller controls the switch in response to the firing start to shape the switching current to satisfy operation requirements of the TRIAC.

15. A method, comprising:
detecting a firing start by a triode for alternating current (TRIAC) in a power supply based on a voltage output from a rectifier that rectifies an alternative current (AC) voltage from the power supply;
generating a pulse width modulation (PWM) signal to voltage-control a switch in connection with a magnetic component in response to the firing start;
turning on the switch, and turning off the switch when a switch current flowing through the magnetic component rises to a first peak current limit in a duration; and
turning on the switch, and turning off the switch when the switch current flowing through the magnetic component rises to a second peak current limit in order to shape a profile of a current pulled from the power supply to satisfy a latch current requirement and a hold current requirement of the TRIAC.

16. The method of claim 15, wherein generating the PWM signal to voltage-control the switch in connection with the magnetic component in response to the firing start to shape the profile of the current pulled from the power supply to satisfy the latch current requirement and the hold current requirement of the TRIAC further comprises:
controlling at least one of a peak current limit and a frequency for generating the PWM signal to pull the current at a first level to enable enough latch current for the TRIAC at the firing start.

17. The method of claim 15, wherein generating the PWM signal to voltage-control the switch in connection with the magnetic component in response to the firing start to shape the profile of the current pulled from the power supply to satisfy the latch current requirement and the hold current requirement of the TRIAC further comprises:
controlling at least one of a peak current limit and a frequency for generating the PWM signal to pull the current at a second level that is lower than the first level to enable enough hold current for the TRIAC after the firing start.

18. The method of claim 15, further comprising:
controlling at least one of a peak current limit and a frequency for generating the PWM signal to control at least one of a rising edge delay for the current to rise to the first level, a rising edge slope for the current to rise to the first level, a duration for the current to above a threshold, and a falling edge slope for the current to fall from the first level to the second level.

19. The method of claim 15, further comprising:
detecting the switching current passing through the switch; and
generating the PWM signal according to the detected switching current to shape the current pulled from the power supply.

20. The method of claim 15, further comprising:
flowing a damping current by a damping circuit in response to the firing start to satisfy a latch current requirement for the TRAIC.

\* \* \* \* \*